T. C. SINCLAIR.
SIGHT FOR ORDNANCE.
APPLICATION FILED FEB. 25, 1919.
1,304,816.
Patented May 27, 1919.
5 SHEETS—SHEET 2.
FIG. 2.
FIG. 1B.
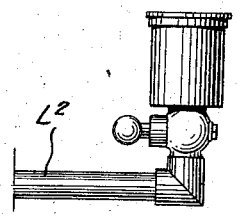
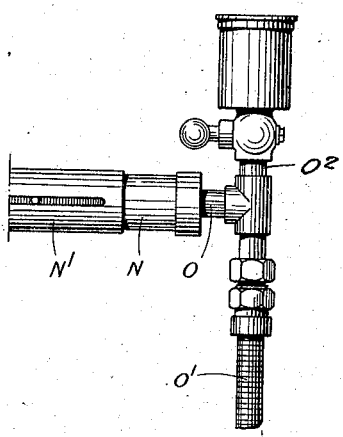
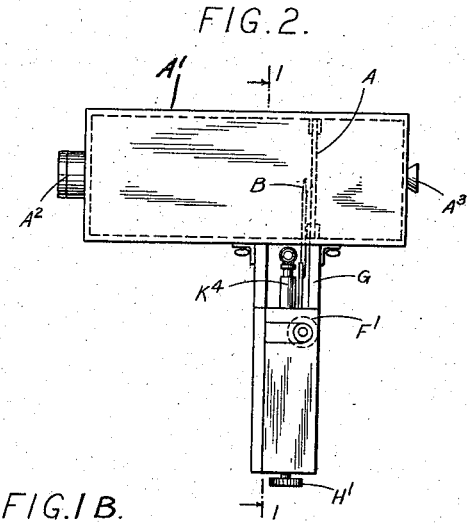
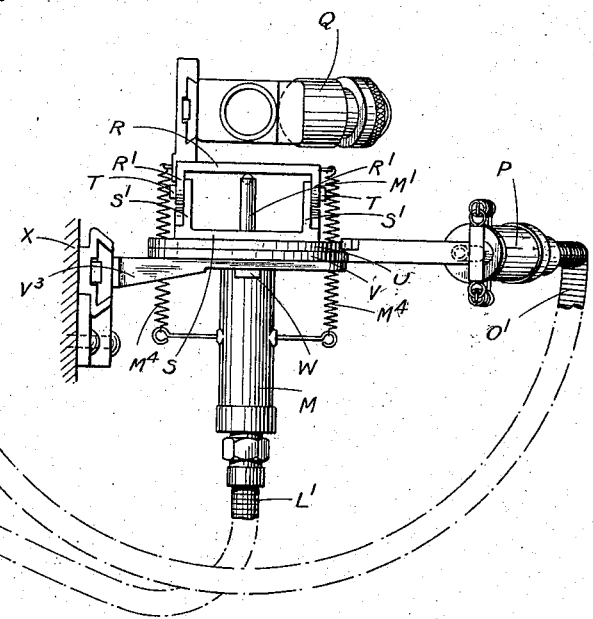
Inventor.
T. C. Sinclair,
By Foster, Freeman, Watson & Coit,
Attorneys.

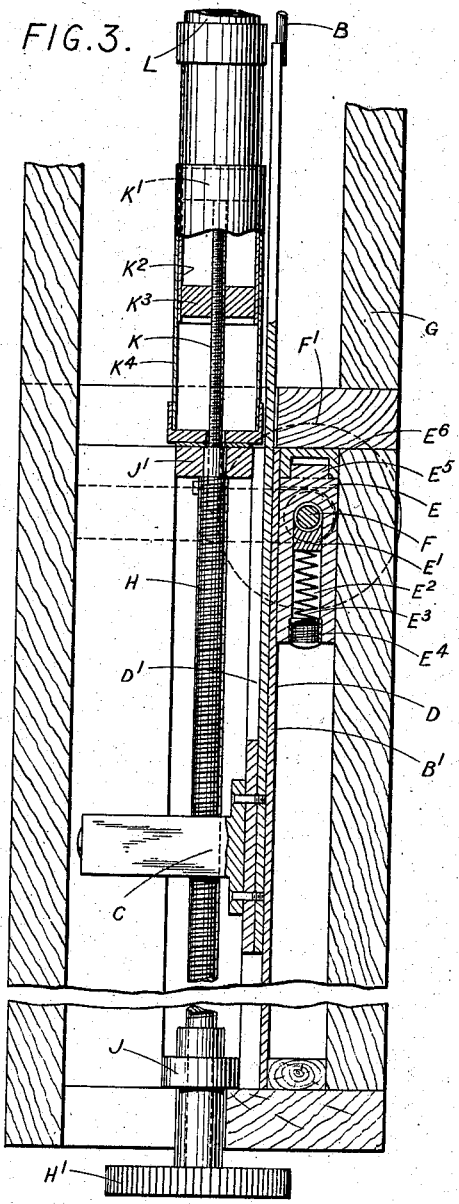

T. C. SINCLAIR.
SIGHT FOR ORDNANCE.
APPLICATION FILED FEB. 25, 1919.

1,304,816.

Patented May 27, 1919.
5 SHEETS—SHEET 4.

T. C. SINCLAIR.
SIGHT FOR ORDNANCE.
APPLICATION FILED FEB. 25, 1919.

1,304,816.

Patented May 27, 1919.
5 SHEETS—SHEET 5.

Inventor.
T. C. Sinclair,
By Foster, Freeman, Watson & Coit,
Attorneys.

UNITED STATES PATENT OFFICE.

THOMAS CHARLES SINCLAIR, OF NEWPORT, ISLE OF WIGHT, ENGLAND.

SIGHT FOR ORDNANCE.

1,304,816.　　　　Specification of Letters Patent.　　Patented May 27, 1919.

Application filed February 25, 1919. Serial No. 279,189.

*To all whom it may concern:*

Be it known that I, THOMAS CHARLES SINCLAIR, lieutenant-colonel Royal Field Artillery, Anti-Aircraft Reserve Brigade, a subject of the King of England, and resident of Newport, Isle of Wight, in England, have invented certain new and useful Improvements in Sights for Ordnance, of which the following is a specification.

This invention relates to sights for ordnance and more especially for guns employed for attacking aircraft and has for its object to effect certain improvements in sighting devices of this type.

In the sighting device as previously described two lines of sight or indications thereof such as an image or images of the target are simultaneously presented to an observer and by means of these lines of sight the direction and rate of travel of the target is measured on the field of the observing instrument. The lines of sight are movable relatively to each other and one of them is so arranged as to be constituted by, coincide with or represent the true line of sight and has the same relation to the axis of the gun as the true line of sight. The second line of sight is so arranged that it can be brought into coincidence with the first or true line of sight but the two lines of sight are then relatively movable in any direction from their initial positions. The two lines of sight being in coincidence are laid with the gun on a moving target and at a suitable moment one of the lines of sight is fixed while with the other the target is followed for a definite period. The travel and direction of the target is thus presented to the observer by a line shown on the field of observation of the instrument. By means of the measure thus obtained conveniently with the aid of graduations arranged in the field of the instrument it is possible to so lay the gun with the necessary "lead" that is to say in advance of the target as it pursues its path as to insure hitting it.

It was intended that a device of this nature should be mounted directly on or in close proximity to the gun and it was preferably arranged so that the device itself constituted the sight by means of which the gun was laid and fired. It is desirable however in some cases to enable the necessary observations to be made by one man while the gun is actually laid and fired by one or more others by means of sights which are mounted on the gun but adjusted in accordance with the observations of the separate observer. This end is attained by the present improvements.

According to this invention the sight of the gun in addition to the ordinary adjustments for range and deflection is so constructed and arranged as to be capable of other and separate adjustments in a plane normal to the gun axis. These adjustments may all be effected in a single sight or two sights may be provided one of which is adjustable in one direction say for elevation while the other is adjustable in another direction for deflection. An observing instrument of the type indicated which enables the direction and rate of travel of a moving target to be measured on the field of the instrument is mounted in some suitable manner and position separate from the gun and at a convenient distance therefrom. Between this instrument and the gun sight or sights are connections which are preferably flexible and disconnectible and such that the gun sight or sights can be adjusted by and in accordance with the measurements made with the observing instrument. Thus while one man is making the necessary observations on the moving target the gun is being simultaneously laid by one or two other men who use for the purpose the sights on the gun which are being then adjusted by the observer as he makes his observations on the separate instrument. In the observing instrument in question the measurements are made on a ground glass or similar screen on to which the image of the target is projected and hence the line of sight in this instrument during observation swings or moves about the lens as a pivot or center in directions opposite to those directions in which the line of sight passing through the gun sight or sights must be swung or pivoted in order to adjust the latter in the required manner in relation to the gun. The reversal of these swinging movements of the separate lines of sight which is thus necessary may be effected by means of the transmission mechanism which is so constructed and arranged that swinging of the line of sight in the observing instrument will cause opposite but equal or proportionate swinging of the line of sight through the gun sight or sights.

The invention may be put into practice in various forms but the following may be given as an example.

In the preferred construction the observing instrument comprises a lens so mounted as to project an image of the target on a screen of ground glass or the like. The lens and screen may be arranged so as to be relatively adjustable for focusing purposes but they are otherwise disposed in such fixed relation that when truly pointed at or laid on the target the image of the latter will appear on the screen in coincidence with a central mark on the screen. The whole device is so movably mounted on a suitable tripod or other stand that it can be laid on the target and readily clamped or fixed when in the desired position for commencing the observations. To facilitate the initial aiming of the device it may be provided with a pair of sights of some suitable type which constitute a line of sight parallel to that passing through the center of the lens and the central mark on the screen. A series of concentric circles are drawn about the center mark the circles being equidistant or otherwise arranged as desired. A pointer or a mark of some convenient type carried by an arm or otherwise is so mounted that it can be moved in any direction over the surface of the screen. Conveniently this pointer or mark is arranged to be movable in two directions at right angles to each other by means of screws with milled heads or hand wheels. For example, a pointer arm may be carried by a saddle or the like which engages a screw-threaded spindle mounted for instance horizontally in suitable bearings in a frame. The latter is arranged to slide in a vertical direction in an outer frame and at right angles to the axis of the screw-threaded horizontal spindle. The vertical sliding of this spindle with the pointer in the outer frame may be effected by means of a screw-threaded shaft which engages a sleeve or nut carried by the sliding frame in which the horizontal spindle is mounted.

The instrument is used in the following way. In the first place the device is directed at the target the image of which is brought into coincidence with the central mark on the screen and at a suitable moment the lens and screen are fixed. By means of the milled heads or the like and screw-threaded rods the pointer or movable mark is caused to follow the target image on the screen for a convenient interval of time which may be equal to the time of flight of the projectile when fired from the gun at the range of the target. Alternatively this time of observation may be some convenient fraction of the time of flight when by means of the circles on the screen it is possible to set the pointer so as to show on the screen the distance traveled by the target in the time of flight as well as the direction of travel. By means of the connecting mechanism hereinafter described these movements of the pointer will have caused corresponding movements of the gun sight or sights so that if the gun is laid by these adjusted sights and fired it will have the necessary "lead" to insure the hitting of the target.

If a single gun sight is employed this is mounted for example so that it can slide or rock vertically in a frame which in turn is arranged so as to be capable of sliding or rocking horizontally on a bed which can itself be moved so as to give the sight as a whole the necessary adjustments for range and deflection. The bed is suitably formed and graduated to enable these adjustments to be made. The vertical and horizontal movements of the sight may be brought about in various ways as for instance by means of screw-threaded rods which are rotated by sliding racks each engaging a pinion carried by a rod or the sight and frame may each be directly pushed or drawn in either direction. Where two sights are used each is mounted on a bed which is so formed as to be adjustable for range and deflection. One sight is so mounted that it can be moved vertically on its bed while the other is arranged so as to be movable horizontally on its bed. Each of these sights is conveniently in the form of or comprises a slit or wire or is otherwise constructed so that it can be readily kept on the target in spite of movement of the gun in a direction other than that which is intended to be regulated by means of that sight. Thus the sight which is adjustable horizontally has a vertical viewing slit or the like while the vertically adjustable sight has a horizontal slit or wire. Whether single or double sights are used these may each be of any convenient known type either open or otherwise or in telescopic form.

The connections between the observing instrument and the sight or sights may be mechanical or hydraulic. In the mechanical form devices of the nature of Bowden wires may be used while the hydraulic form may comprise tubes preferably flexible and of small diameter containing liquid such as water. The reversal of the swinging movements of the separate lines of sight which as indicated may be necessary may be effected either at the observing instrument or at the sight and may be brought about in various ways.

Graduations are preferably arranged both on the observing instrument and on the sight on or in conjunction with each main sliding or moving part and the member or guide on which it slides so as to permit of testing and proper relative setting or adjustment between the instrument and the sight.

As indicated in the prior specification describing the type of observing instrument this instrument may be made in a form which does not involve the use of a screen on which the image of the target is projected. In that case the movements of the target are observed, for instance through an eyepiece, and measured in the actual direction in which they take place by means of a pointer or the like and a fixed mark and wires or other graduation devices suitably arranged in the field of the instrument. With such a construction of the observing instrument there would naturally be no need to reverse the direction in which the lines of sight in the observing instrument and in the gun sight or sights are respectively swung about their centers or pivots.

The details of construction may be arranged or modified to meet requirements such as the particular type or structure of sight or gun to which it may be desired to apply the present invention. Though the invention has been above described more particularly in conjunction with a somewhat modified form of the earlier type of sighting device which modified construction in itself forms a part of the present invention it is to be understood that the main part of this invention may be applied to or used in conjunction with other forms of the sighting device described in the prior specifications referred to.

In the accompanying drawings which illustrate by way of example one method of putting the invention into practice.

Figure 1$^A$ and Fig. 1$^B$ taken together illustrate in rear elevation the principal operative features of the observing instrument and the sight mounting.

Fig. 2 is a side elevation on a reduced scale of the complete observing instrument, Fig. 1$^A$ in so far as it relates to the observing instrument being in effect a section on the line 1—1 in Fig. 2 looking in the direction of the arrows.

Fig. 3 is a section on the line 3—3 in Fig. 1$^A$ looking in the direction of the arrows and showing on an enlarged scale the mechanism for moving the pointer of the observing instrument.

Like letters indicate like parts throughout the drawings.

Figure 1:
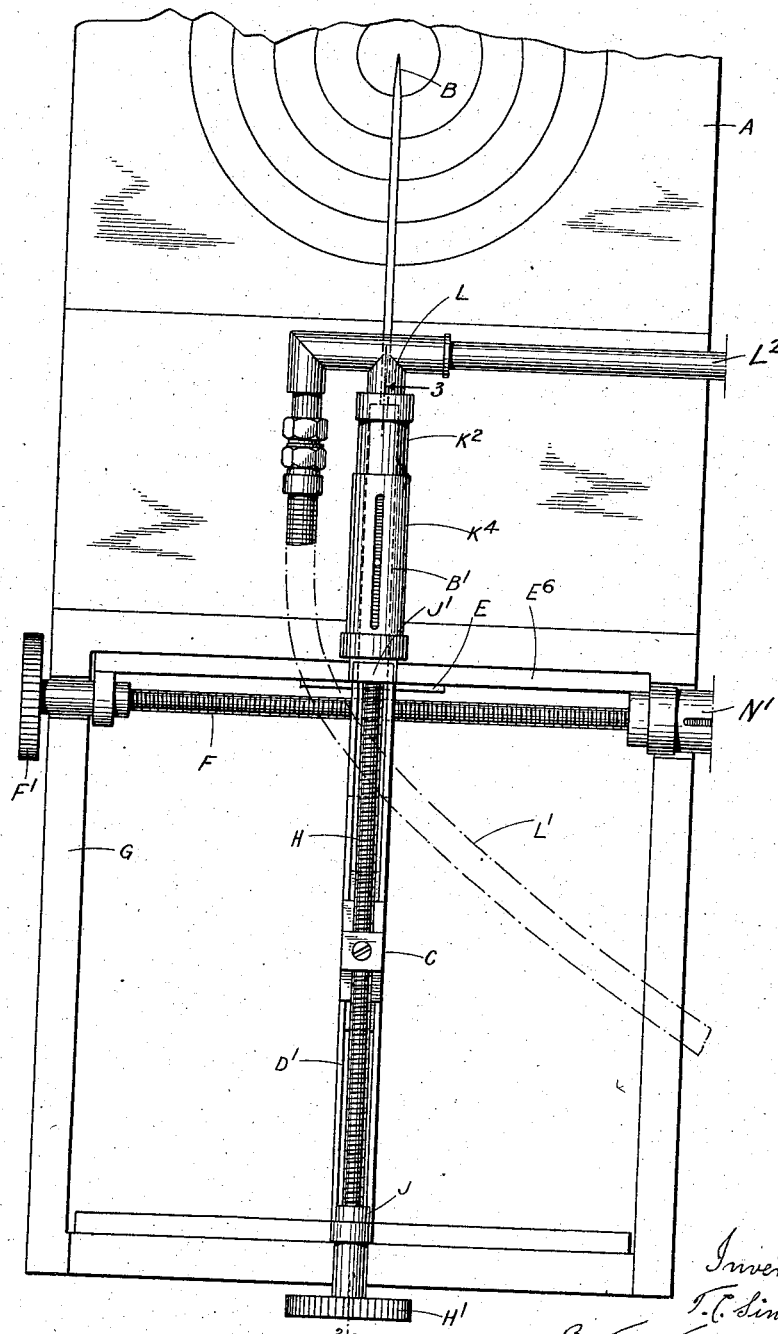

The observation instrument comprises a ground glass or other like screen A having a central mark and graduations or marks such as concentric circles this screen being mounted in a suitable casing A' and at the necessary focal distance from a lens A$^2$ an eyepiece A$^3$ being disposed at the other end of the casing. A pointer B is movable over the face of the screen A in any direction this movement being effected by traversing and elevating the pointer by means of the following mechanism. The pointer B is mounted on a member B' to which is rigidly connected a block or saddle C. The member B' is a sliding fit within a trough shaped vertical guide comprising a strip D with lateral flanges D'. This guide D D' is rigidly connected to a block or saddle E which is internally screw threaded to engage a horizontally disposed screw-threaded rod F. The latter is carried at its ends in suitable bearings mounted on a rectangular frame G so that the rod F can be rotated by a milled head F' on the end thereof but cannot move axially. The frame G is rigidly connected conveniently in some detachable manner to the underside of the casing A'. Conveniently some device is provided in order to prevent or take up back-lash between the saddle E and the screw-threaded rod F. Such a device for example may comprise a shaped block E' screw-threaded on one face to engage the rod F and mounted so that it can slide radially with respect to the rod F in a recess E$^2$ formed in the saddle E. The block E' is pressed into engagement with the rod F by a spring E$^3$ whose outer end bears against a set screw E$^4$. The saddle E is provided with a projection E$^5$ which is a sliding fit within a fixed trough shaped guide E$^6$ mounted on a part of the frame G. The saddle C is conveniently constructed in like manner to the saddle E and similarly engages a vertically disposed screw-threaded rod H on one end of which is a milled head H' by means of which the rod H can be rotated. This rod like the rod F is carried toward its ends in suitable bearings which permit of its rotation but prevent its axial movement. The bearings J J' for the rod H are carried by the guide member D D'. The arrangement is such that when the rod H is rotated the saddle C will move along it and the pointer B will be raised or lowered on the screen A while on the other hand if the rod F be rotated the saddle E will move horizontally carrying with it the guide member D D', the saddle C, the rod H and the pointer B which will thereby be caused to move horizontally across the screen.

On the end of the rod H opposite to that which carries the milled head H' is mounted co-axially a rod K provided with a screw-thread the pitch of which conveniently differs from that of the rod H in some suitable proportion so that a slower movement can be obtained from the rod K than from the rod H. On the end of the rod K is fixed a piston K' which is a sliding fit within a cylinder K² at the lower end of which is fixed a block or nut K³ having a central screw-threaded hole adapted to engage the rod K which passes through the block K³. The cylinder K² is a sliding fit within a cylinder K⁴ the lower end of which is fixed to the bearing J' which as mentioned is in turn carried by the vertical slide D D'. It will be seen that by rotation of the compound rod H K the cylinder K² can be caused to rise or fall when the piston K' will reciprocate in the cylinder K². The movements of the piston K' in the cylinder K² are similar and proportionate to but less than the vertical movements of the pointer B over the screen A. To the open end of the cylinder K² is connected the end of a pipe L and it will be apparent that if this pipe is filled with liquid the movement of the cylinder K² in the manner indicated will cause the piston K' within it to exert a pumping action on this liquid drawing it into or expelling it from the cylinder K². To the rigid pipe L is connected a flexible metallic or like tube L' whose other end opens into a cylinder M containing a piston with rod M' extending from the opposite end of this cylinder. If now the cylinder K², pipe L, flexible tube L' and cylinder M be all completely filled with liquid the movement of the piston K' within the cylinder K² will be communicated to the piston rod M' which will reciprocate simultaneously and identically with the movement of the piston K' in the cylinder K². Thus as the compound screw-threaded rod H K is rotated and the pointer B is thereby moved in one direction or the other there will be imparted to the piston rod M' through the liquid connection between the cylinders K² and M movements which are simultaneous and proportionate to the movements imparted to the pointer B.

On the end of the screw-threaded rod F is mounted a screw-threaded extension on the end of which is a piston which can be caused to reciprocate in a cylinder N by means of a block or nut engaging the screw-threaded extension, the construction being identical with the extension K of the rod H, the piston K', cylinder K² and block or nut K³. The arrangement is such that as the rod F is rotated the cylinder N can be caused to reciprocate within the guide cylinder N' which is fixed to the framing G. To the open end of the cylinder N is connected a pipe O from which runs a flexible metallic or like tube O' whose other end opens into a cylinder P in which reciprocates a piston having a piston rod P' projecting from the opposite end of the cylinder, see Fig. 4. The cylinder N, pipe O, flexible tube O' and cylinder P are all completely filled with liquid so that when horizontal movements are imparted to the pointer B by rotation of the rod F, proportionately similar and simultaneous movements will be imparted to the piston rod P' through the liquid connection between the cylinders N and P. In this way it will be seen that as the observer follows with the pointer B the movements of the image of the target over the screen A, the movements that are by the observer given directly to the pointer in vertical and horizontal directions will respectively be imparted accurately on a reduced scale to the piston rods M' and P' and through these rods these movements can be communicated to the gun sight.

Figure 4:
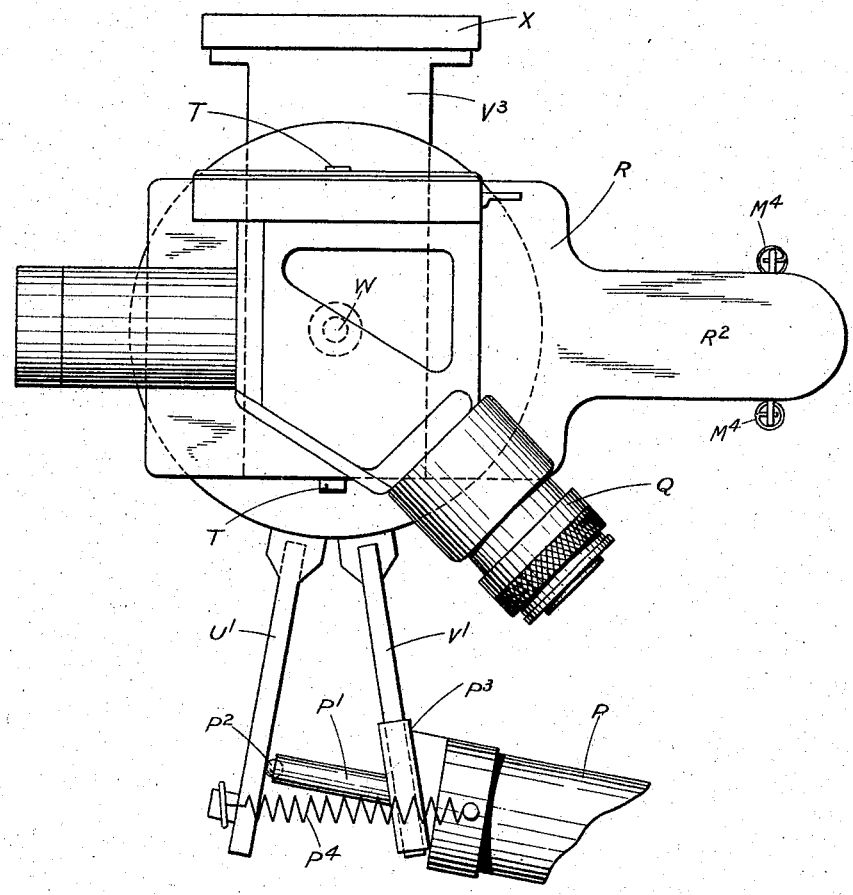
Fig. 4 is a plan of the sight and its mounting on an enlarged scale showing the manner in which deflection or traversing adjustment is imparted thereto.
Figure 5:
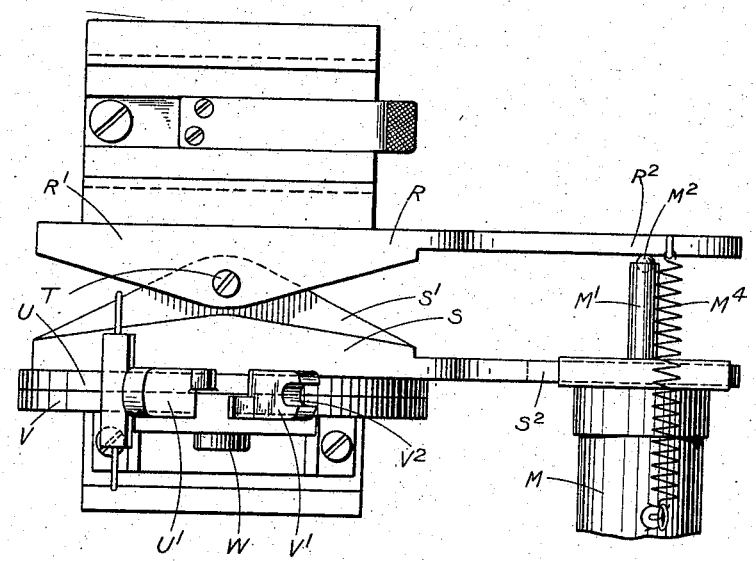
Fig. 5 is a side elevation of the sight mounting on the same scale showing the manner in which elevation adjustment is imparted thereto.
Figure 6:
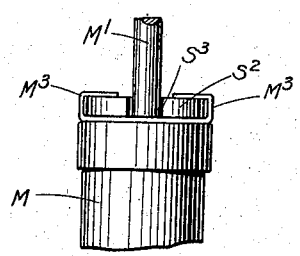
Fig. 6 is an end view of the arm in Fig. 5 which carries the cylinder with the operating piston and illustrates a manner of adjustably mounting this cylinder.

The movements thus given to the piston rods M' and P' can be communicated to the gun sight in various ways but one construction is shown by way of example in Figs. 4 and 5. The sight Q which may be of any suitable type is mounted in some convenient manner on a bed which comprises a plate R having two downwardly directed flanges R'. Beneath the bed plate R is another plate S provided with two upwardly directed flanges S' which lie closely against the flanges R'. Pivot pins T couple these flanges together so that the bed R carrying the sight Q can be rocked on the bed S. The rocking plate R is provided with a lever arm R² which is conveniently formed as a flat extension of the plate R, as clearly shown in Fig. 4. The plate S is provided with a similar lever arm S² to which is attached the cylinder M. A slot S³, shown in Fig. 6, is formed in the lever S² to allow of the passage of the piston rod M'. The end of the piston rod M' is directed toward the lever R² and bears against this lever so that movements of the piston rod are imparted to the lever R². In order to reduce friction the end of the piston rod M' is conveniently provided with a hemispherical recess containing a ball M² which thus forms a spherical end to the rod M'. The ball M² bears against a suitable hard flat surface formed on the lever R². A convenient method of mounting the cylinder M on the lever S² comprises members M³ of U-section attached to the end of the cylinder M and adapted to embrace the lever S² in such a way that the cylinder can be slid on to the end of the lever S² and moved along it into such a position as will enable the desired leverage to be exerted and the necessary proportional movement to be obtained in the rocking of the bed plate R and the sight Q carried thereon. The members M³ are preferably formed of spring metal so as to grip the lever S² and when the cylinder is positioned keep it in place, but if desired a set screw or like device may be employed to fix the cylinder on the lever S² when the position of the former is determined. Springs M⁴ connect the lever R² to the cylinder M in such a way that they tend constantly to draw the levers S² and R² together and keep the lever R² in contact with the end of the piston rod M'. It will be seen that in this way there is imparted to the sight Q by means of the piston rod M' and springs M⁴ a rocking or elevating movement proportionate to the vertical movement of the pointer B on the screen A, but it is to be noted that owing to the manner in which the sight is connected to the pointer B as the latter is lowered on the screen the sight is depressed and conversely when the pointer B is raised the sight is elevated. This means that as the line of sight passing through the pointer to the target swings about the lens as a pivot or center, so does the line of sight passing through the gun sight, swing about the center pins T but in the opposite direction.

The bed plate S is rigidly connected to a circular plate U which in turn lies on a similar plate V. The plates U and V are pivotally connected by a pin W the plates being so formed and engaged that they can be rotated relatively through such an angle as may be deemed desirable. The plate U is provided with a lever arm U' and the plate V has a similar arm V'. On the arm V' is mounted the cylinder P so that the end of the piston rod P' bears through a friction ball P² on the face of the lever U'. The arrangement is similar to the mounting of the cylinder M on the lever S². A slot V² is formed in the end of the lever V' for the passage of the piston rod P' and the cylinder P is provided with U-shaped members P³ to engage the end of the lever V' and admit of the position of the cylinder being adjusted on the lever. Springs P⁴ run between the lever U' and the cylinder P. Thus movements of the piston P' in either direction are communicated to the lever U' with the result that the sight Q together with the plates R and S and the cylinder M, can all be traversed to the necessary extent for deflection adjustments. These deflection or traversing movements of the sight are proportional to the movements of the pointer B across the screen A, but it will be noted that the swinging movements of the two lines of sight are reversed and that if the pointer B is moved to the left so as to swing that line of sight to the right the sight will be swung to the left and conversely if the pointer B is moved to the right so as to bring its line of sight to the left the sight will be traversed to the right. The plate V is provided with an arm V³ by means of which it is rigidly connected in some convenient manner to some portion X of the gun.

It will be seen that in the construction illustrated the pipe L is provided with a branch pipe L² and the pipe O with a branch O², each branch terminating with a cup having a stop cock below it, by means of which in each construction the pipe and cylinder can be filled with liquid.

With the above described apparatus it will be seen that the observing instrument can be erected at any suitable point at such a convenient distance from the gun as may be found desirable the instrument being connected by the pipes L' O' with the adjustable mechanism on which the sight Q is mounted. The gunner is thus free to lay the gun by means of the sight Q and follow the target continuously. Meanwhile the sight Q can be independently adjusted by the observer who is following the image of the target over the screen A by means of the pointer B. The observer is thus concerned only with making the necessary adjustments in the sight Q which are effected automatically in accordance with the movements of the pointer B while on the other hand the gunner is not concerned with the adjustments for elevation and deflection which are being made in the sight Q by the observer but has only to follow the target. The observer can then inform the gunner when as a result of his observations the sight Q has been given the necessary adjustments to insure the projectile having the necessary "lead" when the gun is fired and the firing of the gun can then be effected by the gunner at the proper moment.

In the apparatus more particularly described above by way of example with reference to the drawings it will be noted that actually the sight is so constructed and arranged that all adjustments thereof and not only those for "lead" are effected by the observer and in accordance with the movements of the pointer. Either before or preferably after the observation for "lead" the pointer is further moved in accordance with suitable range or elevation and deflection scales corresponding adjustments being thereby effected in the gun sights. It is to be appreciated however, that if desired the construction of the sight and its arrangement may be such that it will be capable of adjustments on its base or mounting which adjustments are made independently of the observer. Such adjustments would be for purposes of range and deflection and be made as if the gun was to be fired at a stationary target. The further adjustments in the sight necessary to give the required "lead" when firing at a moving target would then be superimposed as it were on the other adjustments and effected by the observer in the manner described.

What I claim as my invention and desire to secure by Letters Patent is:—

1. In a sighting device for ordnance the combination with a sight mounted on a gun and adjustable for range and deflection, of an observing instrument mounted separate from the gun and comprising a pointer movable in any direction over a ground glass or other screen, and connections between the observing instrument and the gun sight whereby movements of the pointer are communicated instantaneously to the sight to thereby correspondingly adjust the same for range and deflection.

2. In a sighting device for ordnance the combination with a sight mounting secured to a gun and adjustable for range and deflection, a sight secured to said mounting, an observing instrument mounted separate from the gun by means of which instrument the direction and rate of travel of a moving target can be simultaneously measured, and flexible detachable connections between the observing instrument and the sight mounting whereby the latter may be adjusted instantaneously in accordance with the observing instrument.

3. In a sighting device for ordnance the combination with a sight mounted on a gun and adjustable for range and deflection, of an observing instrument mounted separately from the gun comprising a pointer, two rotatable screw threaded rods disposed at right angles for moving the pointer in any direction in a given plane, a cylinder associated with each of said screw threaded rods, two cylinders associated with said adjustable sight, a piston in each of the four cylinders, two flexible tubes each connecting one of the cylinders on the sight with a cylinder on the observing instrument; the tubes and cylinders being filled with liquid so that movement of the piston in the cylinder at one end of a tube will cause proportionate movement of the piston in the cylinder at the other end of the tube, means for respectively connecting each screw threaded rod to a cylinder and piston at one end of each tube, and means for respectively connecting the piston and cylinder at the other end of each tube to the adjustable sight, whereby movements of the pointer cause similar and simultaneous movements of the sight.

4. The combination with a gun, a support for a sighting device in fixed relation to the gun, and a sighting device movably mounted on said support, of an observing instrument supported independently of the gun, adjusting means on said instrument, and connections between said adjusting means and the sighting device whereby said device is automatically adjusted for range and deflection to correspond with adjustments of said instrument.

5. The combination with a gun, a support for a sighting device in fixed relation to the gun, and a sighting device movably mounted on said support, of an observing instrument supported independently of the gun, adjusting means on said instrument, and a connection between said adjusting means and the sighting device whereby the sighting device is automatically adjusted for range and deflection to correspond with the adjustments of said instrument, said connection being flexible whereby the observing instrument is unaffected by movements of the gun.

6. The combination with a gun, a support for a sighting device in fixed relation to the gun, and a sighting device movably mounted on said support, of an observing instrument supported independently of the gun, adjusting means on said instrument and connections between said adjusting means and the sighting device whereby said device is automatically adjusted for range and deflection to correspond with adjustments of said instrument, said connections being flexible whereby the observing instrument is unaffected by movements of the gun.

7. In a sighting device for ordnance, in combination, a sight, a movable support for said sight secured to a gun and adapted to be manipulated to adjust the sight for range and deflection, an instrument apart and at a distance from the gun for determining the proper line of sight for any given target, and means operatively connected to said support and to said instrument whereby the position of the support may be changed at will and the sight adjusted for any given target by an operator standing at said instrument.

8. In a sighting device for ordnance, in combination, a sight, a movable support for said sight secured to a gun and adapted to be manipulated to adjust the sight for range and deflection, an instrument apart and at a distance from the gun for determining the proper line of sight for any given target, said instrument having a fixed element and a movable element for determining said line of sight by establishing two points thereon, and means operatively connecting said sight support and the movable element of said instrument whereby the support is automatically manipulated and the sight adjusted for a given target by an observer stationed at said instrument and properly positioning said movable element.

9. In a sighting device for ordnance, the combination with a sight mounted on a gun and adjustable for range and deflection, of an independent instrument apart from the gun for observing a moving target and having an element adapted to be manipulated to simulate the position of a target, and means operatively connecting said instrument and said sight whereby the latter is automatically adjusted for range and deflection when said element is moved.

10. In a sighting device for guns, a support for a sight adapted to be secured to a gun or gun carriage, and having a member rotatable about two axes at right angles to each other, and a sight secured to said member, in combination with an instrument apart from said sight for observing any given target and having two elements, one of which is movable and adapted to be adjusted so that both of said elements are in the line of sight to the target, and means operatively connecting the movable element of the instrument with the rotatable member supporting the sight whereby the latter is moved and the sight thereby adjusted for range and deflection when the former is moved into the line of sight through the target and the other element.

11. In a sighting device for guns, a support for a sight adapted to be secured to a gun or gun carriage, and having a member rotatable about two axes at right angles to each other, and a sight secured to said member, in combination with an instrument apart from said sight for observing any given target and having a stationary and movable element, the latter being adapted to be adjusted so that the line of sight from the stationary element to any given target passes therethrough, and means operatively connecting the movable element of the instrument with the rotatable member supporting the sight whereby the latter is moved and the sight thereby adjusted for range and deflection when the former is moved into the line of sight through the same target and the stationary element.

12. In a sighting device for guns, in combination, a sight, a revoluble and tiltable member rigidly connected to and supporting the sight and supported by a gun, whereby the sight may be adjusted for traverse and elevation when said member is manipulated, an instrument apart and at a distance from said sight for determining the proper line of sight for a given target, said instrument having a movable element and a stationary element and means connecting the movable element and the revoluble and tilting member whereby the latter and the sight mounted thereon are automatically positioned by the former when the movable element is positioned to place it in the line of sight through the target and the stationary element.

13. In a sighting device for guns, a sight adapted to be secured to a gun and to be adjusted for range and deflection, in combination with an instrument apart from said sight for observing any given target comprising a lens, a field on which the image of the target may be focused, a pointer adapted to be moved over the field to the point where the image of the target is located, and means operatively connecting the pointer and the adjustable sight, whereby the latter is adjusted for range and deflection for the target at the image of which the pointer is directed.

14. In a sighting device for guns, a sight adapted to be secured to a gun and to be adjusted for range and deflection, in combination with an instrument apart from said sight for observing any given target, comprising a lens, a ground glass plate behind said lens and on which the image of any given target may be focused, a pointer adjacent said ground glass plate and adapted to be moved relatively thereto to any point at which the image of the target is located, and means operatively connecting the pointer and the sight whereby the latter is moved in proportion to the movements of the former to adjust the sight for range and deflection for the target at the image of which the pointer is directed.

In testimony whereof I have signed my name to this specification.

THOMAS CHARLES SINCLAIR.

Copies of this patent may be obtained for five cents each, by addressing the "Commissioner of Patents, Washington, D. C."